United States Patent
Wang

(10) Patent No.: US 10,795,438 B2
(45) Date of Patent: Oct. 6, 2020

(54) ELECTRONIC FINGER DEVICES WITH CHARGING AND STORAGE SYSTEMS

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/127,603

(22) Filed: Sep. 11, 2018

(65) Prior Publication Data

US 2019/0310706 A1 Oct. 10, 2019

Related U.S. Application Data

(60) Provisional application No. 62/653,157, filed on Apr. 5, 2018.

(51) Int. Cl.
| | |
|---|---|
| *G06F 3/01* | (2006.01) |
| *H02J 7/02* | (2016.01) |
| *G06F 1/16* | (2006.01) |
| *G02B 27/01* | (2006.01) |
| *H02J 7/00* | (2006.01) |

(52) U.S. Cl.
CPC ......... *G06F 3/014* (2013.01); *G02B 27/0176* (2013.01); *G06F 1/163* (2013.01); *G06F 3/016* (2013.01); *H02J 7/00* (2013.01); *H02J 7/025* (2013.01); *G02B 2027/0178* (2013.01)

(58) Field of Classification Search
CPC .......... G06F 3/014; G06F 3/016; G06F 1/163; G02B 27/0176; G02B 2027/0178; H02J 7/0052

See application file for complete search history.

(56) References Cited

U.S. PATENT DOCUMENTS

| | | |
|---|---|---|
| 5,581,484 A | 12/1996 | Prince |
| 5,631,861 A | 5/1997 | Kramer |
| 6,388,247 B2 | 5/2002 | Asada et al. |
| 8,368,641 B2 | 2/2013 | Tremblay et al. |
| 8,610,548 B1 | 12/2013 | Provancher |
| 8,724,861 B1 | 5/2014 | Sun |
| 8,994,827 B2 | 3/2015 | Mistry et al. |

(Continued)

FOREIGN PATENT DOCUMENTS

| | | |
|---|---|---|
| JP | 2001104256 A | 4/2001 |
| JP | 2008171409 A | 7/2008 |

(Continued)

*Primary Examiner* — Robert J Michaud
(74) *Attorney, Agent, or Firm* — Treyz Law Group, P.C.; G. Victor Treyz; Kendall W. Abbasi

(57) ABSTRACT

A system may include one or more finger-mounted devices such as finger devices with U-shaped housings configured to be mounted on a user's fingers while gathering sensor input and supplying haptic output. The finger devices may have power receiving circuitry configured to receive power from a power source. The power source may be incorporated into an electronic device such as a battery case, a head-mounted display, or a wireless charging mat or stand. The power source may supply power through terminals that form ohmic contacts with mating terminals in the finger device or may transmit power wirelessly using capacitive coupling or inductive charging arrangements. A finger device may have hinge structures that allow portions of the device to rotate relative to each other.

27 Claims, 8 Drawing Sheets

(56) References Cited

U.S. PATENT DOCUMENTS

| | | |
|---|---|---|
| 9,104,271 B1 | 8/2015 | Adams et al. |
| 9,110,505 B2 | 8/2015 | Mastrandrea |
| 2003/0214481 A1 | 11/2003 | Xiong |
| 2005/0052412 A1 | 3/2005 | McRae et al. |
| 2006/0103634 A1 | 5/2006 | Kim et al. |
| 2009/0096746 A1 | 4/2009 | Kruse et al. |
| 2009/0153365 A1 | 6/2009 | Salsedo et al. |
| 2009/0267892 A1* | 10/2009 | Faubert .................. G06F 3/044 345/156 |
| 2009/0278798 A1 | 11/2009 | Kim et al. |
| 2009/0287898 A1 | 11/2009 | Kim et al. |
| 2011/0210931 A1* | 9/2011 | Shai ........................ G06F 3/014 345/173 |
| 2011/0213664 A1 | 9/2011 | Osterhout et al. |
| 2013/0069985 A1* | 3/2013 | Wong .................. G02B 27/017 345/633 |
| 2013/0151960 A1 | 6/2013 | Wiertlewski et al. |
| 2014/0101755 A1* | 4/2014 | Tang ........................ H04W 4/80 726/20 |
| 2015/0015180 A1* | 1/2015 | Miller .................... H02J 50/00 320/103 |
| 2015/0248160 A2 | 9/2015 | Provancher et al. |
| 2015/0277559 A1 | 10/2015 | Vescovi et al. |
| 2016/0313798 A1 | 10/2016 | Connor |
| 2017/0003762 A1 | 1/2017 | Ishii et al. |
| 2017/0045948 A1 | 2/2017 | Nattukallingal |
| 2017/0212552 A1* | 7/2017 | Stotler .................... G06F 1/163 |
| 2017/0235332 A1 | 8/2017 | Von Badinski et al. |

FOREIGN PATENT DOCUMENTS

| | | |
|---|---|---|
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| WO | 2012176610 A1 | 12/2012 |

* cited by examiner

ELECTRONIC FINGER DEVICES WITH CHARGING AND STORAGE SYSTEMS

This application claims the benefit of provisional patent application No. 62/653,157, filed Apr. 5, 2018, which is hereby incorporated by reference herein in its entirety.

FIELD

This relates generally to electronic devices, and, more particularly, to input-output components for electronic devices.

BACKGROUND

Electronic devices such as computers can be controlled using computer mice and other input accessories. In virtual reality systems, force-feedback gloves can be used to control virtual objects. Cellular telephones may have touch screen displays and vibrators that are used to create haptic feedback in response to touch input.

Devices such as these may not be convenient for a user. For example, computer mice generally require flat surfaces for operation and are mostly used with desktop computers in fixed locations. Force-feedback gloves can be cumbersome and uncomfortable. Touch screen displays with haptic feedback only provide haptic output when a user is interacting with the displays.

SUMMARY

A system may include one or more finger-mounted devices such as finger devices with U-shaped housings configured to be mounted on a user's fingers while gathering sensor input and supplying haptic output. The sensors may include force sensors, inertial measurement units, proximity sensors, touch sensors, and other sensors. Haptic output devices in the finger-mounted devices may provide vibrations and other haptic output to the fingers of a user as the user interacts with real-world objects and computer-generated virtual objects in virtual reality and mixed reality environments.

The finger devices may have power receiving circuitry configured to receive power from a power source. The power source may be incorporated into an electronic device such as a battery case, a head-mounted display, a wireless charging mat or stand, or other electronic equipment. The power source may supply power through terminals that form ohmic contacts with mating terminals in the finger device or may transmit power wirelessly using capacitive coupling or inductive charging arrangements.

A finger device may have hinge structures that allow portions of the device to rotate relative to each other. This allows the finger device to be placed in a U-shaped configuration for normal use on a user's finger or a flattened configuration or other configuration in which the device is being provided with power from a power source.

DETAILED DESCRIPTION

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, and may include other sensors for gathering information on the interactions between the finger device (and the user's finger on which the device is mounted) and the surrounding environment. The finger device may include a haptic output device to provide the user's finger with haptic output and may include other output components. During operation, a user of a virtual reality or mixed reality device (e.g., head-mounted equipment such as glasses, goggles, a helmet, etc.) may gather information on interactions between the finger device(s) and the surrounding environment (e.g., interactions between a user's fingers and the environment, including finger motions and other interactions associated with virtual content displayed for a user) and may supply appropriate output such as haptic output. Haptic output may be used, for example, to provide the fingers of a user with a desired texture sensation as a user is touching a real object or as a user is touching a virtual object.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. Users can use the finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

Figure 1:
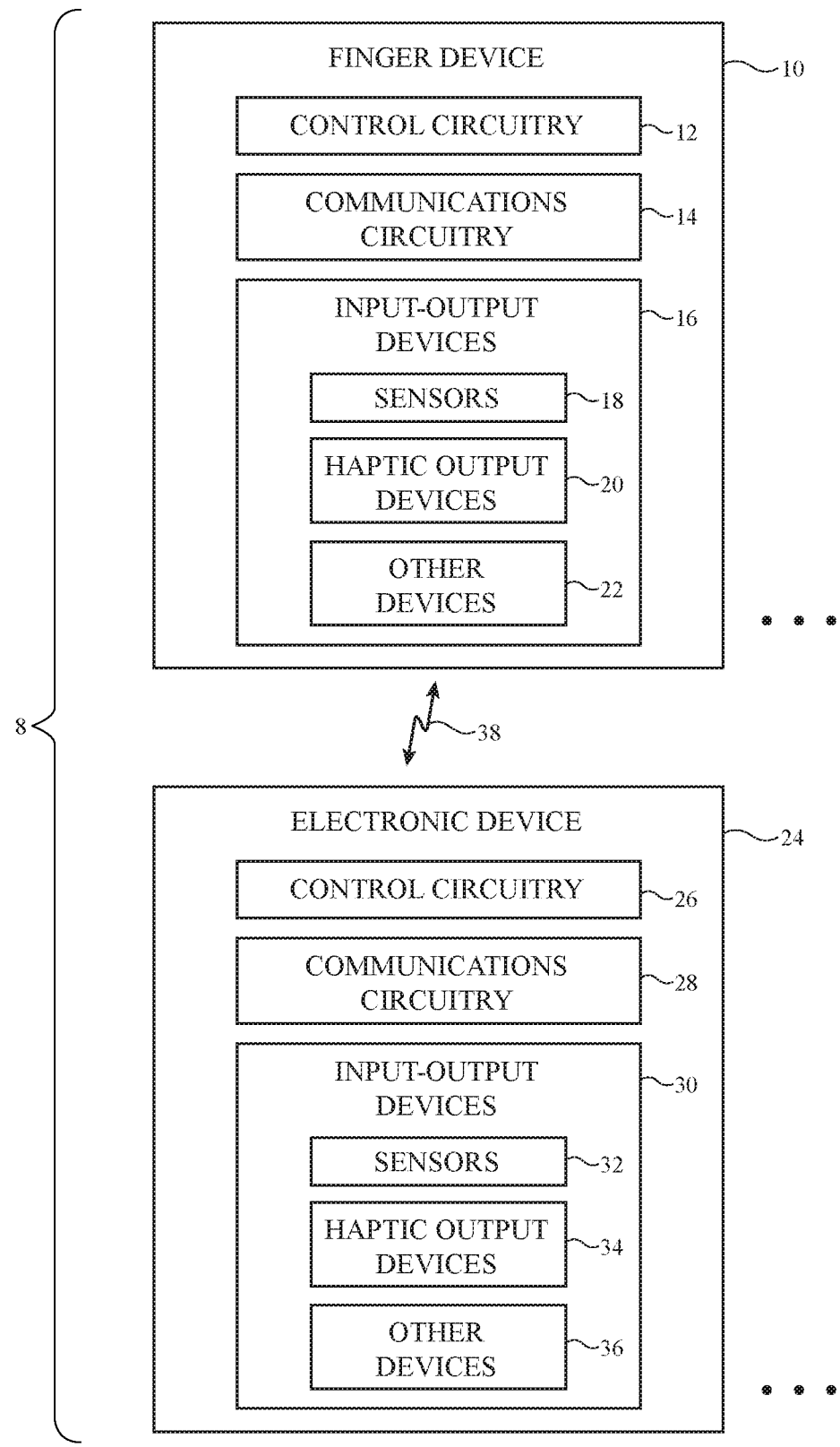
FIG. 1 is a schematic diagram of an illustrative system with a finger device in accordance with an embodiment.

FIG. 1 is a schematic diagram of an illustrative system of the type that may include one or more finger devices. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a finger-mounted device having a finger-mounted housing with a U-shaped body that grasps a user's finger or a finger-mounted housing with other shapes and device(s) 24 is a cellular telephone, tablet computer, laptop computer, wristwatch device, head-mounted device, a device with a speaker, or other electronic device (e.g., a device with a display, audio components, and/or other output components).

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing sensors and light detection and ranging (lidar) sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals, etc.

Figure 2:
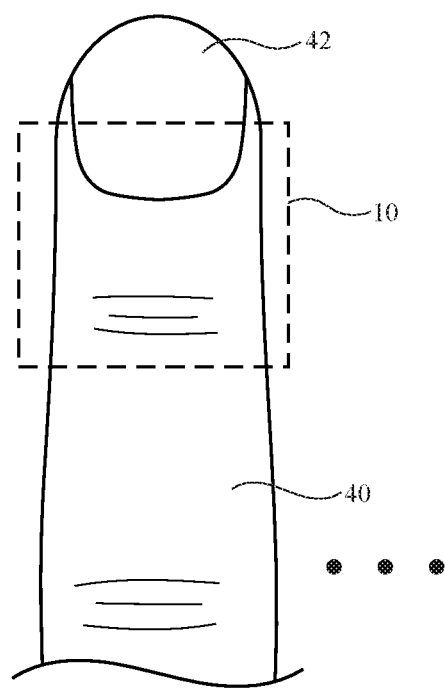
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
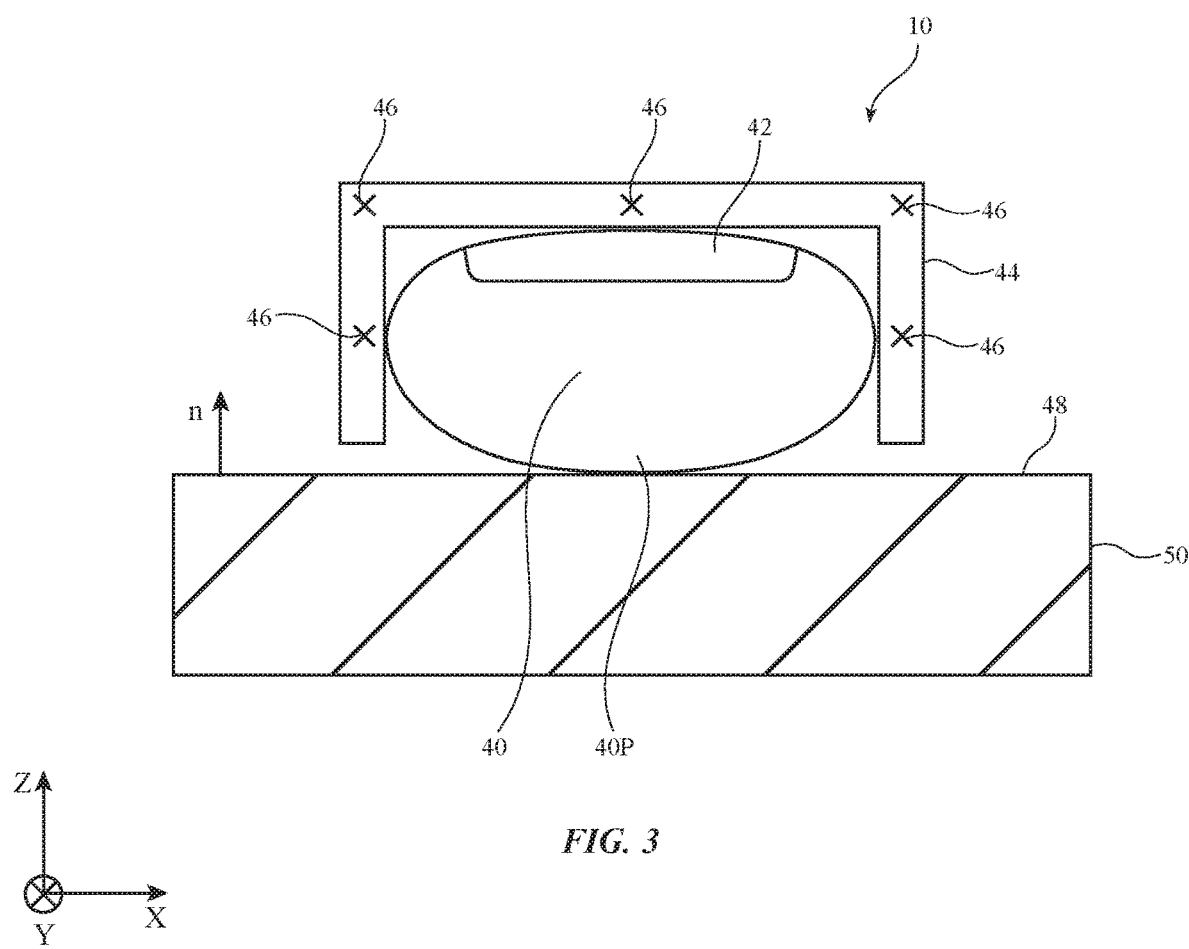
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16) within and/or on the surface(s) of finger device housing 44. These components may, if desired, be incorporated into other portions of housing 44.

As shown in FIG. 3, housing 44 may have a U shape (e.g., housing 44 may be a U-shaped housing structure that faces downwardly and covers the tip of user finger 40 and fingernail 42). During operation, a user may press against structures such as structure 50. As the bottom of finger 40 (e.g., finger pulp 40P) presses against surface 48 of structure 50, the user's finger may compress and force portions of the finger outwardly against the sidewall portions of housing 44 (e.g., for sensing by force sensors in these locations). Lateral movement of finger 40 in the X-Y plane may also be sensed using force sensors on the sidewalls of housing 44 or other portions of housing 44 (e.g., because lateral movement will tend to press portions of finger 40 against some sensors more than others and/or will create shear forces that are measured by force sensors that are configured to sense shear forces).

The force sensors and/or other sensors in device 10 can measure how forcefully a user is moving device 10 (and finger 40) against surface 48 (e.g., in a direction parallel to the surface normal n of surface 48 such as the −Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other structure that the user can contact with finger 40 while moving finger 40 in a desired direction with a desired force. Because motions such as these can be sensed by device 10, device(s) 10 can be used to gather pointing input (e.g., input moving a cursor or other virtual object on a display such as a display in devices 36), can be used to gather tap input, swipe input, pinch-to-zoom input (e.g., when a pair of devices 10 is used), or other gesture input, and/or other user input.

Figure 4:
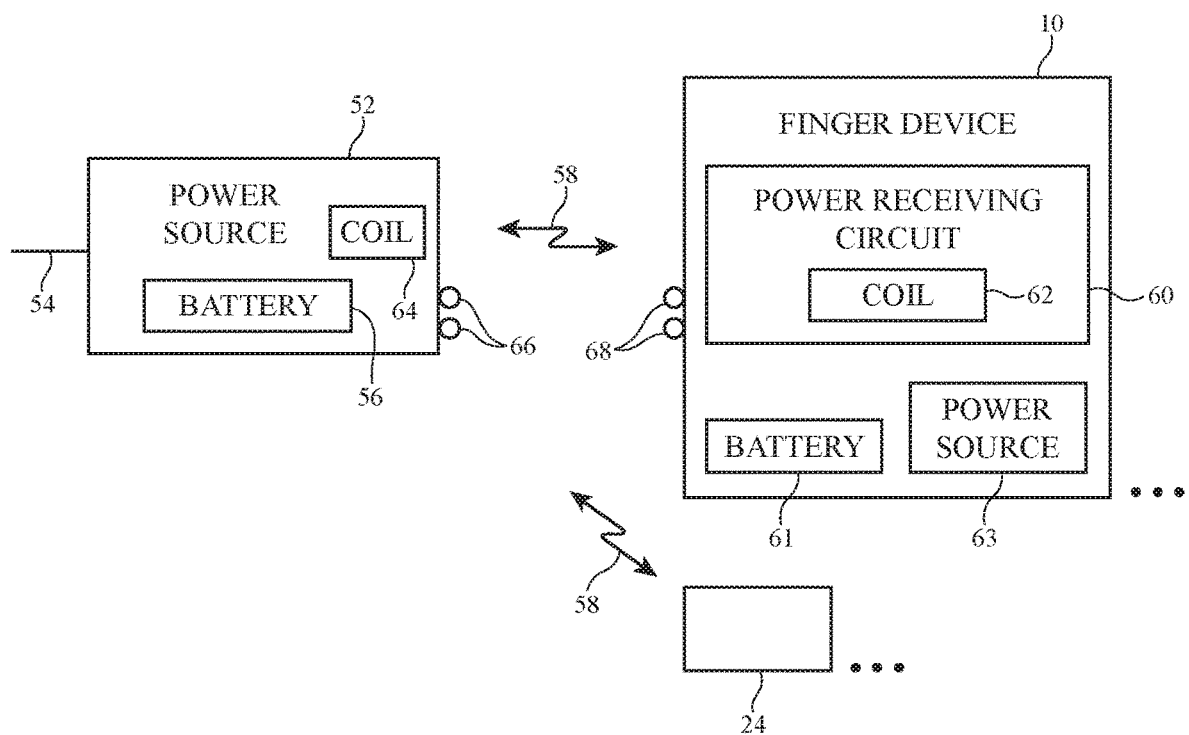
FIG. 4 is a diagram of an illustrative system with a power source and finger device in accordance with an embodiment.

Device 10 may include a battery such as battery 61 of FIG. 4. Power can be conveyed to device 10 from an external power source such as power source 52 to power circuitry in device 10 and/or to charge battery 61. If desired, device 10 may also include an internal power source such as internal power source 63. Power source 63 may be an energy harvesting device. With one illustrative configuration, power source 63 is a solar cell. The solar cell may convert ambient light (e.g., sunlight, etc.) into electrical power for powering device 10 (e.g., to power circuitry in device 10 and/or to charge battery 61). If desired, power source 63 may be an energy harvesting device such as an electromechanical system or piezoelectric component that coverts kinetic energy (e.g., kinetic energy associated with vibrations and/or other movement of device 10 as device 10 is worn on a user's finger) to into electrical power for powering device 10. Energy may also be harvested using a thermoelectric device that converts heat into electrical power, or other energy harvesting devices.

External power source 52 may receive wall outlet power (mains alternating-current power) at input 54 and/or may contain a battery such as battery 56 for supplying power source 52 with direct-current power. Power can be conveyed from power source 52 (e.g., a base station) to device 10 using contacts 66 (e.g., positive and ground terminals) on power source 52 and matching ohmically-contacted contacts 68 on device 10 (e.g., positive and ground terminals in a power receiving circuit in device 10). If desired, power can be conveyed wirelessly between device 52 and device 10. As an example, contacts 66 and 68 (e.g., metal pads) may be capacitively coupled (without forming ohmic contact) to allow power to be transferred and/or power can be conveyed using a wireless power transmitter with a coil in source 52 to transmit wireless power signals (e.g., electromagnetic signals 58) to a wireless power receiver with a coil in device 10 (and/or devices 24). Inductive power transfer techniques may be used (e.g., wireless power can be transmitted using one or more wireless power transmitting coils in source 52 such as wireless power transmitting coil 64 and transmitted wireless power signals can be received in power receiving circuit 60 using power receiving coil 62). Received alternating-current wireless power signals from coil 62 can be converted to direct-current power using a rectifier in power receiving circuit 60 for charging battery 61 and/or for powering circuitry in device 10. In configurations in which the power receiving circuit of device 10 receives power via a wired connection (e.g., using terminals 68), the power receiving circuit may provide the received power to battery 61 and/or other circuitry in device 10.

Figure 5:
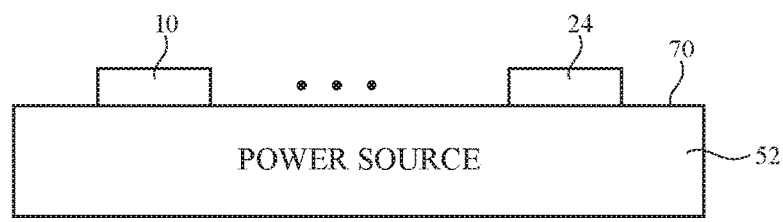
FIG. 5 is a side view of an illustrative power source such as a charging mat and associated electronic devices such as a finger device and other devices that are being wirelessly charged in accordance with an embodiment.

Power source 52 may be a stand-alone wired and/or wireless charging device (e.g., a wireless charging puck, a wireless and/or wired charging stand or base station, a wireless charging mat, or other wired and/or wireless power device) and/or may be incorporated into one or more of devices 24 for providing device 10 with power. In the example of FIG. 5, power source 52 has a planar housing or other housing with a planar charging surface so that power source 52 can serve as a wireless charging mat. Device(s) 10 and/or device(s) 24 can be wirelessly charged by power source 52 when placed in the vicinity of power source 52 (e.g., on charging mat surface 70). Configurations in which wireless power signals can be transmitted and received over larger distances (e.g., at least 1 cm, at least 10 cm, at least 100 cm, at least 1 m, at least 10 m, less than 20 m, less than 2 m, less than 200 cm, less than 20 cm, less than 5 cm, or other suitable distance) may also be used.

Figure 6:
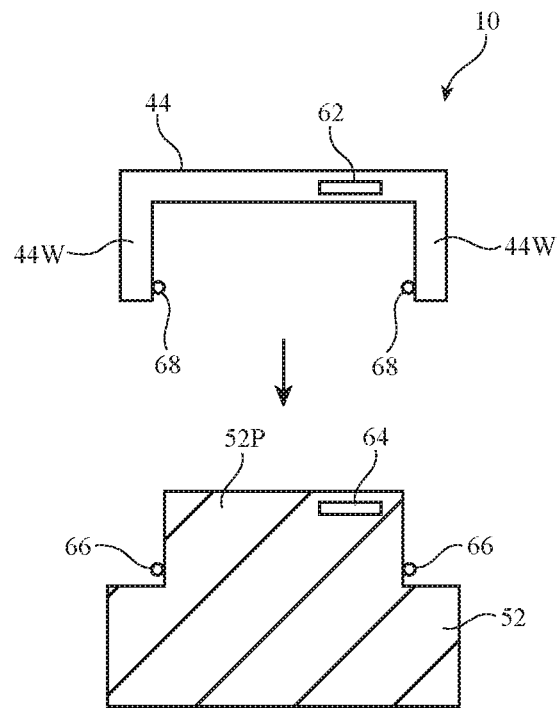
FIG. 6 is a side view of an illustrative finger device and associated power source in accordance with an embodiment.

FIG. 6 is a cross-sectional side view of finger device 10 and power source 52 in an illustrative configuration in which power source 52 has a protruding portion 52P that is received between sidewalls (side portions) 44W of U-shaped housing 44. Contacts 68 on device 10 may mate with contacts 66 of power source 52 when device 10 is placed onto protruding portion (protrusion) 52P and/or wireless power can be transmitted by coil 64 in power source 52 to wireless power receiving circuitry with coil 62 in device 10.

Figure 7:
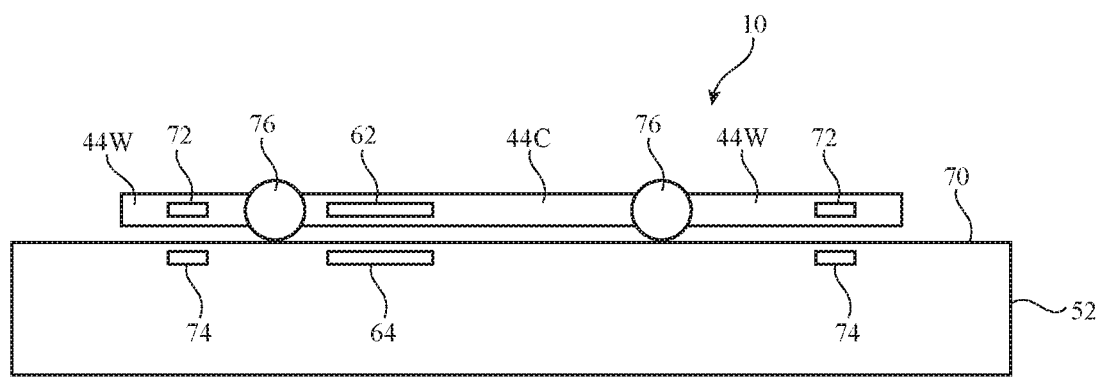
FIG. 7 is a side view of an illustrative flattened finger device with hinges on a charging surface of a power source in accordance with an embodiment.

If desired, device 10 may have hinges or other structures that allow device 10 to be place in multiple configurations. For example, device 10 may be placed in a first configuration such as a normal operating configuration in which device 10 is configured to be worn on a finger of a user or may be placed in a second configuration (sometimes referred to as a stowed configuration, storage configuration, folded configuration, flattened configuration, or charging configuration) in which device 10 is configured for storage and charging. Device 10 may, as an example, have one or more hinges 76 as shown in FIG. 7. As shown in FIG. 7, hinges 76 may allow side housing portions such as sidewalls (side portions) 44W to be moved so as to be co-planar with central (top) housing portion 44C. In this charging configuration, device 10 can be placed flat on charging surface 70 of a wireless charging mat or other power source 52 to receive power.

To help align coil 62 and coil 64 and/or to otherwise hold device 10 to power source 52 or another device (e.g., device 24 of FIG. 1), device 10 and power source 52 (e.g., device 24) may be provided with mating alignment features 72 and 74, respectively. Features 72 and 74 may be, for example, mating protrusions and recesses and/or other interlocking alignment structures (e.g., key and keyhole structures that allow device 10 and/or power source 52 to interlock when engaged by twisting or other locking motions), magnets (or ferromagnetic elements such as iron bars), and/or other alignment structures. If desired, the magnets used in forming features 72 and 74 may be configured so that features 72 and 74 are initially difficult to separate and become easier to separate (and may even spontaneously separate due to magnetic repulsion) once a threshold separation distance has been exceeded. Multiple smaller permanent magnets may be combined in forming features 72 and/or 74 with desired attributes. As another example, one or both of magnetic alignment features 72 and 74 may be formed using electromagnets. To reduce power consumption, a highly coercible (easily magnetized) permanent magnet formed from a magnetic material such as alnico may be used in forming a magnetic alignment feature. An associated electromagnet may be energized whenever it is desired to change the permanent magnetic field created by the magnetic alignment feature (e.g. when desired to connect or disconnect features 74 and 72). At other times, the electromagnet need not be energized, because the permanent magnetic field of the highly coercible permanent magnet will hold features 72 and 74 together (or will repel these features from each other).

In configurations in which features 72 and/or 74 are magnetic attachment structures in device 10 and/or 24 (e.g., magnets, magnetic material that is attracted to magnets, or other magnetic attachment structures), device 10 may be held against the interior and/or exterior of device 24 using the magnetic attachment structures. For example, device 24 may be a battery case with a groove or other recess that receives device 10. Magnetic attachment structures in device 24 (e.g., near the groove) and in device 10 may corporate (magnetically attached) to help secure device 10 within the interior of the case (e.g., without allowing device 10 to rattle excessively inside the case). As another example, device 24 may be a head-mounted device (e.g., goggles and/or glasses) or a strap or other wearable device. In this type of arrangement, magnetic attachment structures may be held against an exterior surface of device 24 (e.g., against a portion of the housing of a pair of goggles or glasses such as along the frame of a pair of glasses, to the front, top, or side surface of a pair of goggles, etc.).

Figure 8:
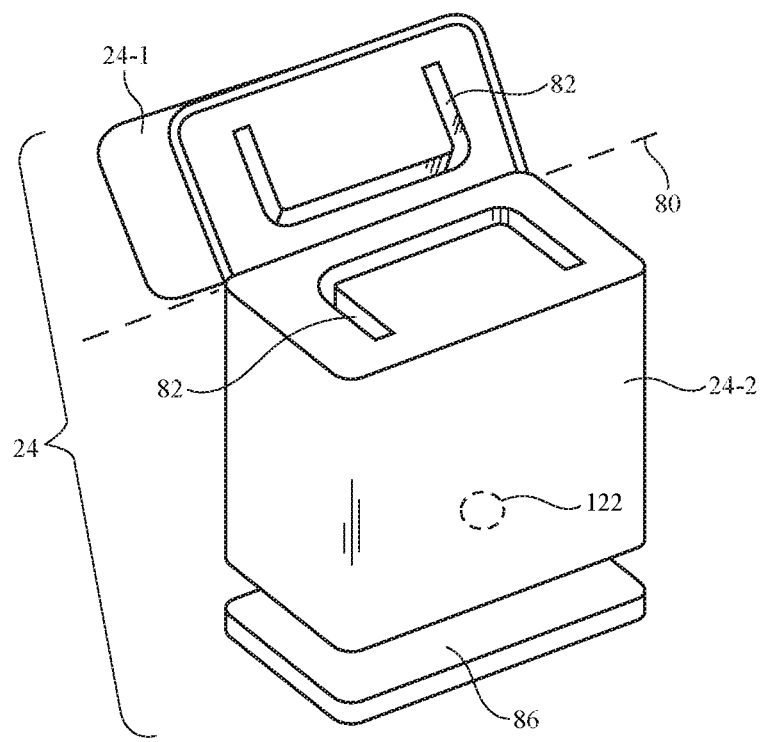
FIG. 8 is a perspective view of an illustrative battery case with a hinged lid for storing and charging a finger device in accordance with an embodiment.

As shown in FIG. 8, device 24 may be a case (e.g., a storage enclosure for device 10, which may sometimes be referred to as a battery case). In this type of arrangement, device 24 may include power source 52 (e.g., a power source with a battery) for charging device 10 when device 10 is placed within the case. In the illustrative configuration of FIG. 8, device 24 has a first portion (e.g., a first housing portion) such as portion 24-1 that rotates about rotational (hinge) axis 80 relative to a second portion (e.g., a second housing portion) such as portion 24-2. Flexible housing portions (e.g., portions of a plastic layer), interlocking metal hinge members, and/or other hinge structures along axis 80 may be provided to allow the first and second portions to rotate. Recesses 82 (e.g., device-shaped grooves or other structures) may be formed in the first and/or second portions of the housing of device 24 and configured to receive device 10 for storage within the interior of device 24. A magnet such as magnet 122 may interact with a corresponding magnetic base such as base 86 (e.g., a stand-alone support structure, a portion of a charging mat with a power source. As described in connection with FIG. 7, magnetic structures (e.g., one or more permanent magnets) may be formed inside a battery case to help hold device 10 (e.g., so that a user may place device 10 loosely in a recess 82, after which the magnets or other magnetic structures in the case and/or device 10 may pull device 10 completely into recess 82). Magnetic structures (e.g., a permanent magnet) in the case may also be used to temporarily secure device 10 to the outer surface of the case.

Figure 9:
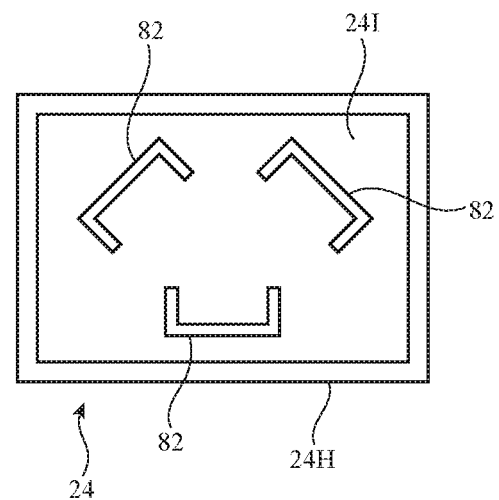
FIG. 9 is a top view of an illustrative storage case for a set of three finger devices in accordance with an embodiment.

FIG. 9 is a top view of an illustrative storage case that is configured to receive multiple devices 10. Device 24 of FIG. 9 (e.g., a battery case) may have an outer portion such as housing 24P and an interior 24I. Recesses 82 and/or other device structures may be configured to receive three devices 10 (or other suitable number of devices 10) in interior 24I. Recesses 82 may be sufficiently shallow to allow the ends of each device 10 to protrude outwardly towards a user's fingertips. With the illustrative configuration of FIG. 9, a user can insert the tips of a thumb, index finger, and middle finger simultaneously into the exposed ends of three corresponding devices 10 in device 24 so that these three devices 10 can be easily placed onto the user's fingertips and removed from interior 24I in a one-handed operation.

Figure 10:
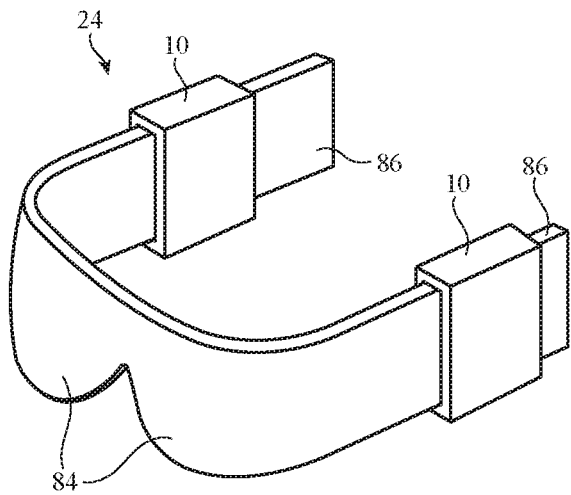
FIG. 10 is a perspective view of an illustrative head-mounted device to which finger devices have been coupled for storage and charging in accordance with an embodiment.

FIG. 10 is a perspective view of device 24 in an illustrative configuration in which device 24 is a head-mounted device such as a pair of glasses. Device 24 may, as an example, have displays, lenses, and/or other components for displaying images for a user in a support structure such as lens portion 84 of the housing of device 24 and may have head-mountable support structures 86 in the housing of device 24 that help support device 24 on the head of the user. Head-mountable support structures 86 may be, for example, temples (sometimes referred to as a frame) for a pair of glasses. Device 24 may be a virtual reality device (and may block a user's direct line-of-sight to real-world objects) or may be a mixed reality device. In a mixed reality device, a front-facing camera may gather images of real-world content to display for a user and/or a user may view the real-world through an optical coupler in lens portion 84 (e.g., an optical coupler that merges computer-generated content and other display content from a display in device 24 with directly viewed light from real-world objects). As shown in FIG. 10, support structures 86 (e.g., a glasses frame) may be configured to receive devices 10 (e.g., devices 10 may be temporarily placed on support structures 86 for storage and charging). Magnets, press-fit structures, clips, hook-and-loop fastener material, straps, and/or other coupling structures may be used to help hold devices 10 in place (e.g., temporarily). During storage on device 24, a power source in device 24 such as power source 52 may supply power to devices 10 (e.g., via direct contact, capacitive coupling, inductive power transfer, etc.).

In addition to or instead of using press-fit arrangements and/or other arrangements in which mechanical engagement is used to hold device 10 to support structures 86 (e.g., the housing of a head-mounted device), magnetic structures may be used. For example, permanent magnets or other magnetic structures may be formed in the frame of a pair of glasses, in the housing of a pair of goggles, or elsewhere in the body of device 24. The magnetic field produced by the permanent magnet(s) may be sufficiently strong to pass through the housing of device 24 and attract a magnetic material and/or permanent magnet in device 10. Using this approach, device 10 may be secured to the frame of the glasses or other housing structure (e.g., device 10 may be held against the outer surface of one or more portions of support structures 86). Because of the use of magnets in these examples, device 10 can be pulled off of device 24 and reattached to device 24 rapidly and without need for complex alignment operations. For example, a user of a head-mounted display, who may be distracted and/or may not be able to view the real world because of the presence of the head-mounted display, may easily place device 10 on a magnetic surface of the head-mounted display (e.g., without looking at this surface). If desired, both mechanical engagement techniques (press fitting, clips, etc.) and magnetic attachment techniques may be used to help secure device 10. For example, magnets may be used for removable (temporary) storage, whereas press fit housing structures and other mechanical attachment structures may be used when longer storage of device 10 on device 24 is desired.

Figure 11:
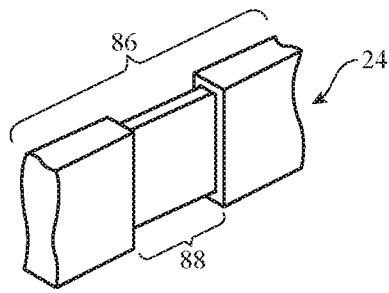
FIG. 11 is a perspective view of a portion of a device such as a head-mounted device that has a recess for receiving a finger device in accordance with an embodiment.

FIG. 11 shows how housing structures in device 24 such as support structures 86 may have one or more recesses 88 that are configured to receive devices 10. Devices 10 may, for example, be pressed into recesses 88 so that the sides of devices 10 clip over the portion of support structures 86 in recesses 88. The presence of recesses 88 may allow devices 10 to be mounted so that some or all of the exposed surfaces of devices 10 are flush with adjacent exposed surfaces of support structures 86 (as an example).

Figure 12:
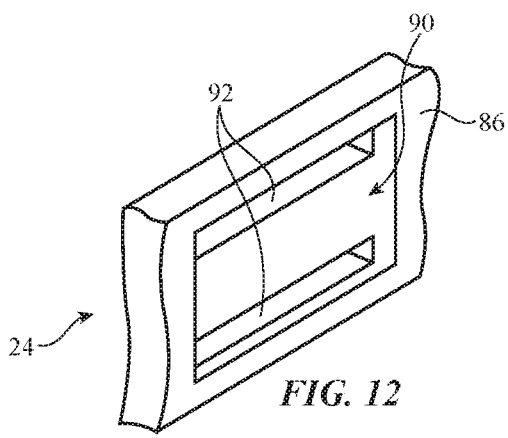
FIG. 12 is a perspective view of a portion of an electronic device with a storage recess having grooves for receiving the sides of a finger device in accordance with an embodiment.

Another illustrative configuration for a finger device storage recess in device 24 is shown in FIG. 12. As shown in FIG. 12, housing structures in device 24 such as support structures 86 or other portions of the housing of device 24 may have a recess such as recess 90 that includes groves 92 (e.g., locally deepened portions of recess 90) to receive the sides of the housing of device 10.

Figure 13:
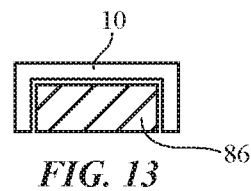
FIGS. 13, 14, and 15 are cross-sectional side views of illustrative electronic device housing structures to which a finger device has been temporarily coupled in accordance with an embodiment.
Figure 14:
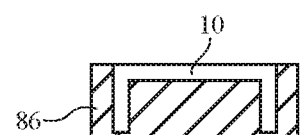
Figure 15:
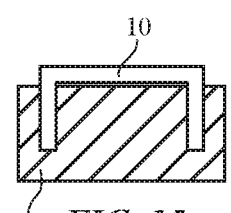

FIGS. 13, 14, and 15 are cross-sectional side views of device 24 in illustrative configurations in which housing structures such as support structure 86 or other housing structures for device 24 have configurations that allow device 10 to clip over the outside of support structures 86 (FIG. 13), to be received within recesses that accommodate both the sides and top portion of device 10 (e.g., so that the exposed upper surface of device 10 lies flush with the exposed adjacent surface of support structures 86 as shown in FIG. 14), or to be received within recesses so that the top of housing of device 10 is proud of the exposed adjacent surface of support structures 86 (FIG. 15).

Figure 16:
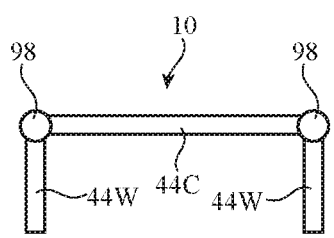
FIG. 16 is a side view of an illustrative finger device with hinges in accordance with an embodiment.
Figure 17:
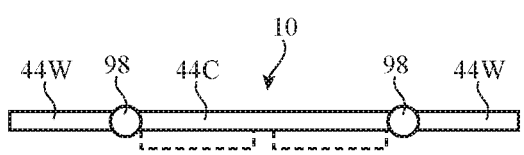
FIG. 17 is a side view of the illustrative finger device of FIG. 16 in a flattened non-U-shape storage configuration in accordance with an embodiment.
Figure 18:
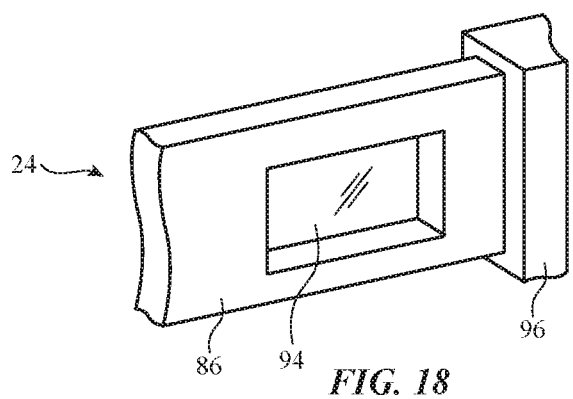
FIG. 18 is a cross-sectional side view of an illustrative housing structure with a recess for receiving the finger device of FIG. 17 in accordance with an embodiment.

As shown in FIGS. 16 and 17, hinges 98 allow housing sidewalls 44W to be rotated or otherwise moved relative to top (central) housing portion 44C. Device 10 of FIG. 16 has a normal operating configuration. In the arrangement of FIG. 17, sidewalls 44W have been rotated relative to central portion 44C (to be planar or to fold under portion 44C as indicated by the dashed-line outlines of portions 44W of FIG. 17), thereby placing device 10 in a storage (charging) configuration. FIG. 18 shows how device 24 may have a recess such as recess 94 in a device housing structure such as support structures 86. Support structures 86 may be coupled to other housing structures in device 24 such as structures 96 (e.g., support structures 86 may form a strap or other holding structure and structures 96 may form a main housing unit for a wristwatch, head-mounted device, or other device (as an example). Recess 94 may be configured to receive device 10 when device 10 is in a flattened state or other configuration for storage and charging (e.g., one of the storage configurations of FIG. 17).

Figure 19:
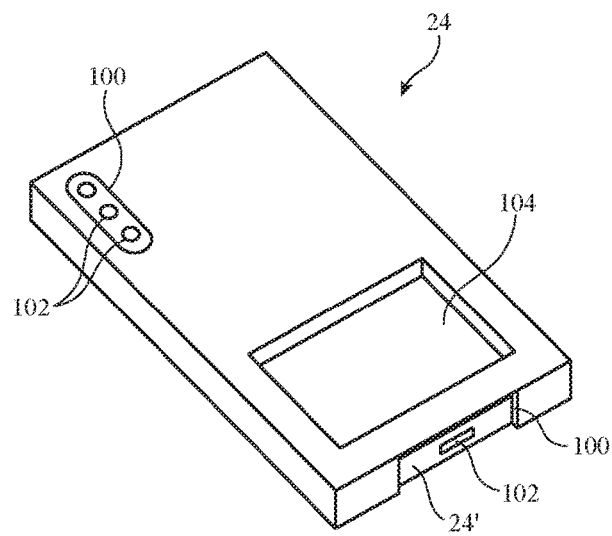
FIG. 19 is a rear perspective view of an illustrative cellular telephone battery case having a recess for receiving a finger device in accordance with an embodiment.

FIG. 19 is a perspective view of device 24 in an illustrative configuration in which device 24 is serving as a battery case for another electronic device (electronic device 24'). Device 24 may have a housing formed from fabric, polymer, metal, glass, and/or other materials and may have openings such as openings 100. Openings 100 may be configured to allow device components 102 (e.g., cameras, sensors, data ports, etc.) of device 24' to be exposed and not covered by device 24. The rear face of device 24 is shown in FIG. 19. On the opposing front face of device 24, device 24 has a recess configured to receive device 24'. On the rear face of device 24 that is shown in FIG. 19, the housing for device 24 has recess 104, which is configured to receive device 10 for charging and/or storage (e.g., when device 10 is in a flattened configuration or other configuration suitable for storage and charging). Power for device 10 can be provided by a power source 52 in device 24 and/or a power source 52 in device 24'.

Figure 20:
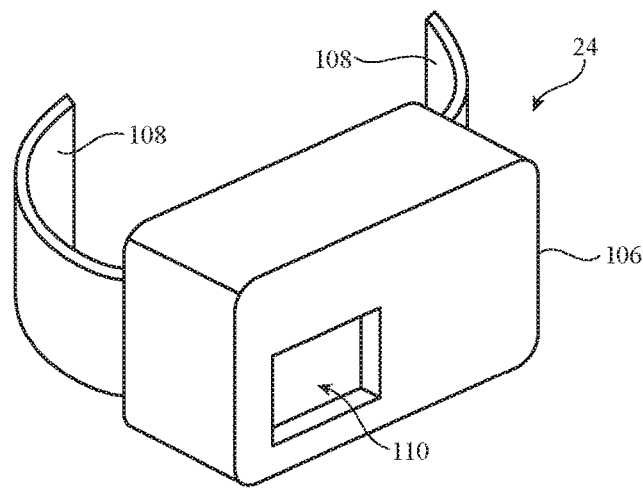
FIG. 20 is a perspective view of an illustrative head-mounted device with a recess for receiving a finger device in accordance with an embodiment.
Figure 21:
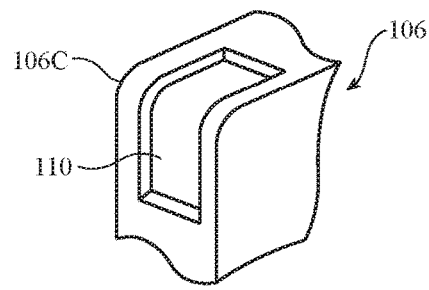
FIG. 21 is a perspective view of an illustrative corner housing portion of a head-mounted device with a recess for receiving a finger device in accordance with an embodiment.

In the examples of FIGS. 20 and 21, device 24 is a head-mounted device (e.g., a pair of virtual reality goggles). Housing portion 106 of device 24 of FIG. 20 forms a goggles housing that is configured to be worn on a head of a user. The goggles housing (housing portion 106) supports an internal display and optical components for displaying images (e.g., virtual reality content) to the user while blocking and thereby preventing light from external real-world objects from being viewed by the user. If desired, camera images from a camera on housing portion 106 can be merged with computer-generated content to provide the user with a mixed reality environment. Straps 108 or other head-mountable support structures such as portions of housing portion 106 may be configured to support device 24 (e.g., the goggles housing) on the user's head. Device 10 may be mounted in recess 110 of housing portion 106 (e.g., when device 10 is in a configuration for charging and storage). Power source 52 in device 24 can supply power to device 10 when device 10 is stored in recess 110.

FIG. 21 shows how recess 110 may be formed over one or more corner portions of housing portion 106 such as corner portion 106C. When device 10 is mounted over a corner of the housing of device 24, hinges 98 or other flexible structures in device 10 may allow portions of device 10 to rotate relative to each other so that device 10 fits within recess 110.

In configurations in which device 10 is coupled to device 24 for storage, power can be conveyed via wired or wireless connections between a power source 52 in device 24 and power receiving circuitry 60 of device 10. If desired, device 10 and device 24 can communicate wirelessly over communications link 38 (e.g., a bidirectional wireless communications link or a wired communications link). In some arrangements, in-band wireless communications can be performed over a wireless charging link (e.g., bidirectional wireless communications can be performed between device 10 and device 24 using coils 62 and 64 during charging operations).

During operation of system 8, a user may move finger device(s) 10. Motion data from devices 10 (e.g., motions tracked using inertial measurement units and/or other tracking systems such as visual tracking systems), deceleration data from devices 10 due to finger contact with external surfaces that are measured with accelerometers or other sensors, strain data or other force sensor data indicative of finger motion normal to an external surface contacted by finger 40 and/or tangential to an external surface contacted by finger 40, proximity and/or touch data from sensors in device 10, and/or other data from sensors 18 is gathered and used in providing haptic output and other output using devices 20 and/or other devices 22 in devices 10 and/or is used in providing haptic output and other output using devices 34 and/or other devices 36 in devices 24. The input gathered from devices 10 can be used to allow a user to interact with computer-generated content displayed on displays in devices 36 (e.g., virtual reality content on the display of a pair of virtual reality goggles, computer-generated content for a mixed reality environment that is displayed with a display in a mixed-reality head-mounted device, etc.) and can be gathered as a user interacts with real-world objects. Haptic device output from devices 20 and/or 34 can be used to provide the fingers of the user with textures, motion sensations, sensations of resistance and vibration, and/or other tactile sensations as the user interacts with computer-generated content and real-world content. Devices 10 and/or 24 can also provide non-haptic output in response to the input gathered using devices 10 and/or the input components of input-output devices 30.

The foregoing is merely illustrative and various modifications can be made to the described embodiments. The foregoing embodiments may be implemented individually or in any combination.

What is claimed is:

1. A finger-mounted device configured to be worn on a finger of a user, comprising:
    a housing configured to be coupled to the finger;
    a force sensor coupled to the housing that measures forces exerted by the finger on the housing;
    a haptic output device;
    control circuitry configured to gather input from the force sensor as the finger moves and configured to provide haptic output to the finger using the haptic output device; and
    power receiving circuitry configured to receive power from an external power source, wherein the power receiving circuitry includes a coil configured to receive wireless power signals transmitted by the external power source while the finger-mounted device is temporarily physically coupled to an external electronic device that contains the external power source; and
    a battery configured to be charged with the received power.

2. The finger-mounted device defined in claim 1 wherein the housing comprises a U-shaped housing.

3. The finger-mounted device defined in claim 1 wherein the finger-mounted device includes a magnet configured to align the housing with respect to the external electronic device.

4. The finger-mounted device defined in claim 1 wherein the housing has hinges configured to allow portions of the housing to rotate relative to each other, wherein the portions of the housing are movable between a first configuration in which the housing is configured to be coupled to the finger; and a second configuration in which the housing is configured to be coupled to the external power source.

5. A head-mounted device, comprising:
    a display;
    a head-mountable support structure configured to support the display and configured to temporarily receive a finger device; and
    a power source configured to supply power to the finger device while the finger device is received by the head-mountable support structure.

6. The head-mounted device defined in claim 5 wherein the finger device has a U-shaped housing configured to be placed over a tip of a finger and wherein the head-mountable support structure is configured to receive the U-shaped housing.

7. The head-mounted device defined in claim 6 wherein the head-mountable support structure has a recess configured to receive sidewall portions of the U-shaped housing.

8. The head-mounted device defined in claim 5 wherein the finger device has hinges configured to allow the finger device to be placed in a folded configuration and wherein the head-mountable support structure has a recess configured to receive the finger device in the folded configuration.

9. The head-mounted device defined in claim 8 wherein the power source is configured to transmit wireless power to the finger device when the finger device is received in the recess.

10. The head-mounted device defined in claim 5 wherein the head-mountable support structure has a recess configured to receive the finger device.

11. The head-mounted device defined in claim 10 wherein the head-mountable support structure comprises a goggles housing that includes the recess.

12. The head-mounted device defined in claim 11 wherein the goggles housing is configured to be worn on a head of a user, wherein the display is mounted in the goggles housing, and wherein the goggles housing prevents light from external real-world objects from being viewed by the user as goggles housing is worn on the head and the display is viewed by the user.

13. The head-mounted device defined in claim 10 wherein the head-mountable support structure comprises a glasses frame that includes the recess.

14. A battery case for charging a finger device, wherein the finger device comprises a finger device housing and a battery within the finger device housing, comprising:
- a battery case housing configured to receive the finger device housing; and
- a power source in the battery case housing that is configured to supply power to the battery within the finger device housing while the finger device housing is received within the battery case housing.

15. The battery case defined in claim 14 wherein the battery case housing has a first recess configured to receive an external electronic device and has a second recess configured to receive the finger device housing.

16. The battery case defined in claim 15 wherein the battery case housing has first and second opposing sides, wherein the first recess is on the first side and receives the external electronic device, and wherein the second recess is on the second side and receives the finger device housing when the finger device housing is in a flattened configuration.

17. The battery case defined in claim 14 wherein the power source includes an additional battery and terminals that are configured to mate with circuitry in the finger device to supply power from the additional battery to the battery in the finger device housing while the finger device housing is received within the battery case housing.

18. The battery case defined in claim 14 wherein the power source is configured to wirelessly transmit power to the finger device.

19. The battery case defined in claim 14 wherein the finger device is a U-shaped finger device, wherein the battery case housing has first and second portions configured to rotate relative to each other, and wherein the battery case housing has an interior configured to receive the U-shaped finger device.

20. A system, comprising:
- a power source; and
- a finger-mounted device configured to be worn on a finger of a user and configured to receive power from the power source, the finger-mounted device comprising:
    - a housing configured to be coupled to the finger, wherein the housing has first and second sidewall portions joined by a top portion and wherein the top portion overlaps a fingernail of the finger;
    - a sensor in the first sidewall portion of the housing;
    - a haptic output device;
    - control circuitry configured to gather input from the sensor as the finger moves and configured to provide haptic output to the finger using the haptic output device; and
    - power receiving circuitry configured to receive power from the power source; and
    - a battery configured to be charged with the received power.

21. The system defined in claim 20 wherein the power source comprises a wireless charging device configured to transmit wireless power and wherein the power receiving circuitry comprises wireless power receiving circuitry having a coil that is configured to receive the transmitted wireless power.

22. The system defined in claim 21 wherein the wireless charging device comprises a wireless charging mat.

23. The system defined in claim 20 wherein the power source comprises a base station.

24. The system defined in claim 23 wherein the base station has first contacts, wherein the power receiving circuitry comprises second contacts configured to mate with the first contacts, and wherein the power receiving circuitry is configured to receive the power from the power source through the first and second contacts.

25. A finger-mounted device configured to be worn on a finger of a user, the finger having a fingertip and finger pulp, the finger-mounted device comprising:
- an energy harvesting device;
- a housing configured to be coupled to the finger;
- a sensor coupled to the housing that detects movement of a side portion of the fingertip as the finger pulp compresses against a surface;
- a haptic output device; and
- control circuitry configured to gather input from the sensor as the finger moves and configured to provide haptic output to the finger using the haptic output device.

26. The finger-mounted device defined in claim 25 wherein the energy harvesting device comprises a solar cell.

27. The finger-mounted device defined in claim 25 wherein the energy harvesting device is configured to convert kinetic energy into electrical power.

* * * * *